UNITED STATES PATENT OFFICE

CONWAY, BARON von GIRSEWALD, HANS WEIDMANN, AND GERHARD ROESNER, OF FRANKFORT-ON-THE-MAIN, GERMANY, ASSIGNORS TO AMERICAN LURGI CORPORATION, OF NEW YORK, N. Y., A CORPORATION OF NEW YORK

PROCESS FOR THE PRODUCTION OF PHOSPHATES

No Drawing. Application filed May 9, 1931, Serial No. 536,312, and in Germany May 19, 1930.

This invention relates to a process for the production of phosphates, especially alkali phosphates, from metal-phosphorus alloys.

It is known to convert ferro-phosphorus into phosphates for example by heating it with alkali salts, such as alkali sulphates. Numerous inconveniences have arisen in effecting these conversions on a practical scale, so far as, on the one hand, the course of the reaction—for example in the conversion of ferro-phosphorus with alkali sulphate at high temperature—is disturbingly exothermic and violent and may even assume an explosive character; whilst, on the other hand, inconveniences, consisting in losses of alkali and difficulties in filtration, are observed in treating the solutions obtained by leaching the reaction products with water. It has been ascertained that these troubles are attributable to the silicon, which is always present, in a considerable amount for example to the extent of 13% and over, in commercial ferro-phosphorus.

It has transpired that not only is the excessive violence of the reaction due to the high silicon content of the commercial grades of ferro-phosphorus, but also that said silicon content is the cause of the losses of alkali, and of the troubles encountered in treating the liquors obtained from the reaction products. The reason is that the silicon contained in the metal-phosphorus compound reacts with the alkali sulphate, or other alkali salt, to form water glass, which is the cause both of the observed losses of alkali and of the difficulty in filtering the solutions obtained on leaching the reaction products.

It has been found that all the reactions in question can be effected with ease and without trouble, and that the solutions obtained by treating the reaction products with water can be filtered with ease, and also that the previous losses of alkali can be prevented, by performing the said reaction with a metal-phosphorus compound, such as ferro-phosphorus, which has either been prepared in such a manner that the silicon content does not exceed 3–5% at the outside, or which has been pretreated in any convenient manner so as to remove the silicon down to the specified limits.

It has already been proposed to lessen the excessive violence of the reaction of siliceous ferro-phosphorus with alkali salts, to a greater or less extent, by adding to the reaction components ballast substances, such as an excess of alkali sulphate, or by treating the ferro-phosphorus with steam, before or during the reaction, by which means it is partially oxidized, so that the heat disengaged during the reaction with the alkali salt is correspondingly reduced. Although a diminution in the total heat generated in the reaction can be effected in this manner, it does not remedy the other aforesaid drawbacks entailed by the employment of siliceous metal-phosphorus compounds.

According to the process of the present invention, these drawbacks also can be obviated even when commercial ferro-phosphorus is used, which is high in silica, and at the same time, such siliceous originating materials can be converted without trouble and without appreciable losses of alkali, into products which, when leached with water or suitable aqueous liquids, furnish solutions which filter perfectly, provided the siliceous phosphorus alloys, such as ferro-phosphorus, employed have their silicon content reduced before hand to at least the aforesaid limits.

The removal of the silicon can be effected by known methods, and advantageously according to the process of our co-pending application No. 528,977, by heating the siliceous metal-phosphorus with oxides, such as ferric oxide, or other oxygen-bearing compounds, at temperatures at which the silicon of the metal-phosphorus compound, combines with the oxygen of the oxygen-bearing compound, such as ferric oxide, to form silica, or by heating with phosphates, such as tricalcium phosphate, in which case the silicon of the metal-phosphorus compound is again oxidized to silica by the oxygen of the phosphate, whilst the phosphorus liberated from the phosphate replaces the silicon in the metal-phosphorus compound and thus, at the same time, increases its phosphorus content.

The process of the present invention is applicable, with the same advantage as in the production of ordinary phosphates, to the production of pyro- and meta-phosphates, and indeed to all compounds, containing phosphorus and oxygen, obtainable from metal-phosphorus alloys.

*Example 1*

100 parts of ferro-phosphorus having a high silicon content (containing 18.2% phosphorus, and 15.1% of silicon) were fused at a temperature of 1160° C. with 145 parts of sodium sulphate and 10 parts of coal.

The solidified melt was not homogeneous, but consisted of three layers. The upper layer was composed of three quarters of the whole melt, which contained 9.1% of water-soluble phosphorus in the form of trisodium phosphate and 13.2% of $SiO_2$ in the form of water glass. This layer only contained 78% of the total phosphorus added.

The middle layer consisted of iron sulphide, containing 5% of phosphorus calculated on the charge. The bottom layer consisted of phosphoriferous iron which had escaped reaction. The loss of phosphorus calculated on the charge amounted to 17%.

*Example 2*

100 parts of ferro-phosphorus, poor in silicon (containing 22% of phosphorus and 0.8% of silicon) were fused in the same manner as set forth in Example 1 with 135 parts of sodium sulphate and 10 parts of coal. The solidified melt formed a completely homogeneous mass which was lixiviated with water. The solution obtained contained 98% of the phosphorus added as practically silica-free trisodium phosphate. The dried residue, consisting of iron-sulphide, contained 28% of sulphur and only 0.2% of phosphorus.

We claim:

1. A process for the production of phosphates from metal phosphorus compounds having a high content of silicon which comprises removing silicon from the metal phosphorus compound until not more than five percent of silicon remains and thereafter decomposing the metal phosphorus compound at elevated temperature with a salt containing the metal of the desired phosphate.

2. A process for the production of phosphates from ferro-phosphorus having a high content of silicon which comprises removing silicon from the ferro-phosphorus until not more than five per cent of silicon remains and thereafter decomposing the ferro-phosphorus at elevated temperature with a salt containing the metal of the desired phosphate.

3. A process for the production of phosphates from metal phosphorus compounds having a high content of silicon which comprises removing silicon from the metal phosphorus compound until not more than five percent of silicon remains and thereafter decomposing the metal phosphorus compound at elevated temperature with a salt of an alkali metal.

4. A process for the production of phosphates from metal phosphorus compounds having a high content of silicon which comprises removing silicon from the metal phosphorus compound until not more than five percent of silicon remains and thereafter decomposing the metal phosphorus compound at elevated temperature with an alkali metal sulfate.

5. A process for the production of phosphates from metal phosphorus compounds having a high content of silicon which comprises removing silicon from the metal phosphorus compound until not more than five per cent of silicon remains and thereafter decomposing the metal phosphorus compound at elevated temperature with an alkali metal carbonate.

In testimony whereof, we affix our signatures.

CONWAY, BARON von GIRSEWALD.
HANS WEIDMANN.
GERHARD ROESNER.